(12) United States Patent
Korneluk et al.

(10) Patent No.: US 7,363,044 B2
(45) Date of Patent: Apr. 22, 2008

(54) SYSTEM AND METHOD FOR AIDING A LOCATION DETERMINATION IN A POSITIONING SYSTEM

(75) Inventors: Jose E. Korneluk, Boynton Beach, FL (US); Bruce M. Drawert, Arlington Heights, IL (US); Charbel E. Hayek, Plantation, FL (US); Jeffrey S. Markwell, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/259,638

(22) Filed: Sep. 30, 2002

(65) Prior Publication Data

US 2004/0203875 A1 Oct. 14, 2004

(51) Int. Cl.
*H04Q 7/20* (2006.01)
(52) U.S. Cl. ............................ 455/456.6; 455/456.2; 455/456.3; 455/456.1
(58) Field of Classification Search ............. 455/456.1, 455/456.5, 456.6, 34.2; 342/357.02, 357.06, 342/357.1, 357.04
See application file for complete search history.

(56) References Cited

U.S. PATENT DOCUMENTS

| 5,390,339 | A | * | 2/1995 | Bruckert et al. ............ 455/440 |
| 5,708,969 | A | * | 1/1998 | Kotzin et al. ................ 455/423 |
| 6,070,078 | A | * | 5/2000 | Camp et al. ............. 455/456.2 |
| 6,154,656 | A | * | 11/2000 | Camp, Jr. ................. 455/456.2 |
| 6,204,808 | B1 | * | 3/2001 | Bloebaum et al. ..... 342/357.07 |
| 6,392,295 | B1 | * | 5/2002 | Iwaya et al. ................ 257/696 |
| 6,405,132 | B1 | * | 6/2002 | Breed et al. ................ 701/301 |
| 6,411,892 | B1 | * | 6/2002 | van Diggelen ............. 701/207 |
| 6,570,529 | B2 | * | 5/2003 | Richton et al. ......... 342/357.02 |
| 6,587,691 | B1 | * | 7/2003 | Granstam et al. ......... 455/456.1 |
| 2002/0082774 | A1 | * | 6/2002 | Bloebaum .................... 701/213 |
| 2002/0193121 | A1 | * | 12/2002 | Nowak et al. .............. 455/456 |
| 2003/0054837 | A1 | * | 3/2003 | Ennis ......................... 455/456 |

\* cited by examiner

*Primary Examiner*—Jean Gelin
(74) *Attorney, Agent, or Firm*—Scott M. Garrett

(57) ABSTRACT

The invention provides a cellular telephone or other communications device with improved satellite positioning capability. A location reference point and a selective uncertainty range may be used as aiding information to seed a global positioning calculation. In embodiments, the location reference point may represent the location of the cellular service site or other network service site serving the communications device. In embodiments, the selective uncertainty may be selected from a plurality of possible uncertainties and may represent an approximate distance from the communications device to the location reference point. In other embodiments, the selective uncertainty may represent a range of possible locations within a network service area.

34 Claims, 7 Drawing Sheets

| TA Index | Amount of TA (us) | Distance (km) | |
|---|---|---|---|
| | | from | to |
| 0 | 0 | 0.0000 | 4.6875 |
| 1 | 62.5 | 4.6875 | 13.1250 |
| 2 | 125.0 | 13.1250 | 21.5625 |
| 3 | 187.5 | 21.5625 | 30.0000 |
| 4 | 250.0 | 30.0000 | 38.4375 |
| 5 | 312.5 | 38.4375 | 46.8750 |
| 6 | 375.0 | 46.8750 | 55.3125 |
| 7 | 437.5 | 55.3125 | 63.7500 |
| 8 | 500.0 | 63.7500 | 72.1875 |
| 9 | 562.5 | 72.1875 | 80.6250 |
| 10 | 625.0 | 80.6250 | 89.0625 |
| 11 | 687.5 | 89.0625 | 97.5000 |
| 12 | 750.0 | 97.5000 | 105.9375 |
| 13 | 812.5 | 105.9375 | 114.3750 |
| 14 | 875.0 | 114.3750 | 122.8125 |
| 15 | 937.5 | 122.8125 | 131.2500 |

Figure 2

SYSTEM AND METHOD FOR AIDING A LOCATION DETERMINATION IN A POSITIONING SYSTEM

FIELD OF THE INVENTION

The invention relates to the field of communications, and more particularly to techniques for aiding position calculations in a combined communications/positioning device, such as a cellular telephone or other communications device equipped with GPS or other location service.

BACKGROUND OF THE INVENTION

Some cellular telephones and other communications devices now have the capability to determine their location. Several applications for these location-sensitive communications devices have been suggested. Suggested applications for this technology include improved emergency response, location-specific advertising, car or other fleet or asset tracking, and other applications.

Many of the communications devices equipped with location-determining technology use satellite positioning systems such as global positioning satellite (GPS) systems. These satellite positioning systems typically operate by receiving synchronized radio signals from several satellites. One or more correlator will then typically examine the signals for the presence of one or more identifying code. These identifying codes, in the case of GPS known as Gold codes, consist of pseudorandom numbers. Typically, each Gold code corresponds to one satellite in the satellite network and serves to uniquely identify the satellite. Detecting the presence of a Gold code in a radio signal verifies that the received signal is in fact a satellite signal, and indicates which satellite made the transmission. This process of obtaining a signal, verifying the signal's validity, and determining which satellite broadcast the signal is known as signal acquisition.

Once one or more satellite signals have been acquired, the satellite positioning system will typically make dynamic adjustments, such as, for example, adjustments in a local timing reference, in order to maintain a high-correlation signal. This process is known as tracking.

Each of the satellite signals contains information about the time the signal was sent, known as ephemeris data, as well as information about the position of the satellite. From these data, the satellite positioning system is able to calculate its distance from each satellite. The satellite positioning system then uses some form of triangulation to determine its own position.

Traditionally, the process of signal acquisition, tracking, and location calculation can be quite lengthy, often requiring several minutes. This lengthy processing time is undesirable and, for applications such as emergency response, may be unacceptable. Several techniques can be used in cellular telephones and other communications devices to reduce the processing time. Often, information other than the satellite ephemeris data is also provided to the satellite receiver circuitry. This data, known as aiding information, provides actual or approximate information that can be used to expedite or improve the location capability of the receiver which is tracking satellite positioning signals.

Many techniques for improving the performance of satellite positioning systems in communications devices reduce the time required to complete the signal acquisition stage. For example, the communications device may use an almanac containing an estimate of a satellite's position at given time. Knowing the approximate position of the satellite allows the communications device to more quickly locate the signal output from the satellite or other source. Furthermore, the satellite location data in the almanac may be used to calculate or estimate the Doppler shift of the satellite signal. Knowing the Doppler shift of the signal allows the communications device to more quickly lock in on the frequency of the satellite signal, reducing the duration of the acquisition phase. The approximate location of the satellite or the approximate Doppler shift of the signal may therefore be used as aiding information by the satellite positioning circuitry. The almanac may be stored in the communications device itself, or the almanac may be stored in a remote location, such as a cellular processing center or other location. If the almanac is stored in a remote location, information contained in the almanac, or the results of calculations made using information contained in the almanac, may be sent to the communications device via a wireless or other link.

Other techniques used to improve the performance of satellite positioning systems in a communications device reduce the processing time used to calculate the location from the satellite ephemeris data. For example, the triangulation algorithm or other location calculation may be seeded with aiding information indicating an approximate location or with a range of possible locations in order to expedite the calculation or obtain more accurate results. In some communications devices, the approximate location or range of possible locations may be pre-programmed into the device; for example, a device manufactured in a given geographic region may be programmed such that the satellite positioning system will begin searching for its location in that region as a default.

In other devices, the triangulation algorithm may be seeded with the last known location of the mobile device. Yet other devices may use location information about the communications network to seed the triangulation algorithm. For example, a cellular telephone which may be registered to a cellular base station in a service area may use the approximate location of the service area or cell tower as an estimated starting point in the triangulation algorithm or other location calculation.

While these and other techniques may reduce the time required to obtain location data and improve the accuracy of the data, it is still desirable to expedite the process further. For certain applications in which it is crucial to obtain location data as quickly as possible, additional techniques to reduce the processing time are required. Other problems exist.

SUMMARY OF THE INVENTION

The invention overcoming these and other problems in the art relates in one regard to a system and method for expediting a positioning system calculation, in which a reference point and a selective uncertainly are used as aiding information to seed a triangulation or other location algorithm. In embodiments of the invention, a hybrid communications device such as a cellular telephone handset or other device equipped with GPS or other location service may detect the location of a cell service site or other network service site as an initial reference point for position calculations. In embodiments, an area serviced by that particular network site may be subdivided into smaller discrete areas, such as concentric bands of ranges or other subdivisions. According to one aspect of the invention, the communications device may use one of these smaller areas or zones to quantify an estimated uncertainty in the distance from the estimated location. The embedded GPS or other receiver may then use that uncertainty from reference to improve the resulting position calculation, such as by adjusting correlator bandwidth or other resources for more efficient acquisition and tracking.

BRIEF DESCRIPTION OF THE DRAWINGS

The invention will be described with reference to the accompanying drawings, in which like elements are referenced with like numbers, and in which:

FIG. 2 is a table depicting selective position zones in accordance with the present invention.

DETAILED DESCRIPTION OF EMBODIMENTS

Figure 1:
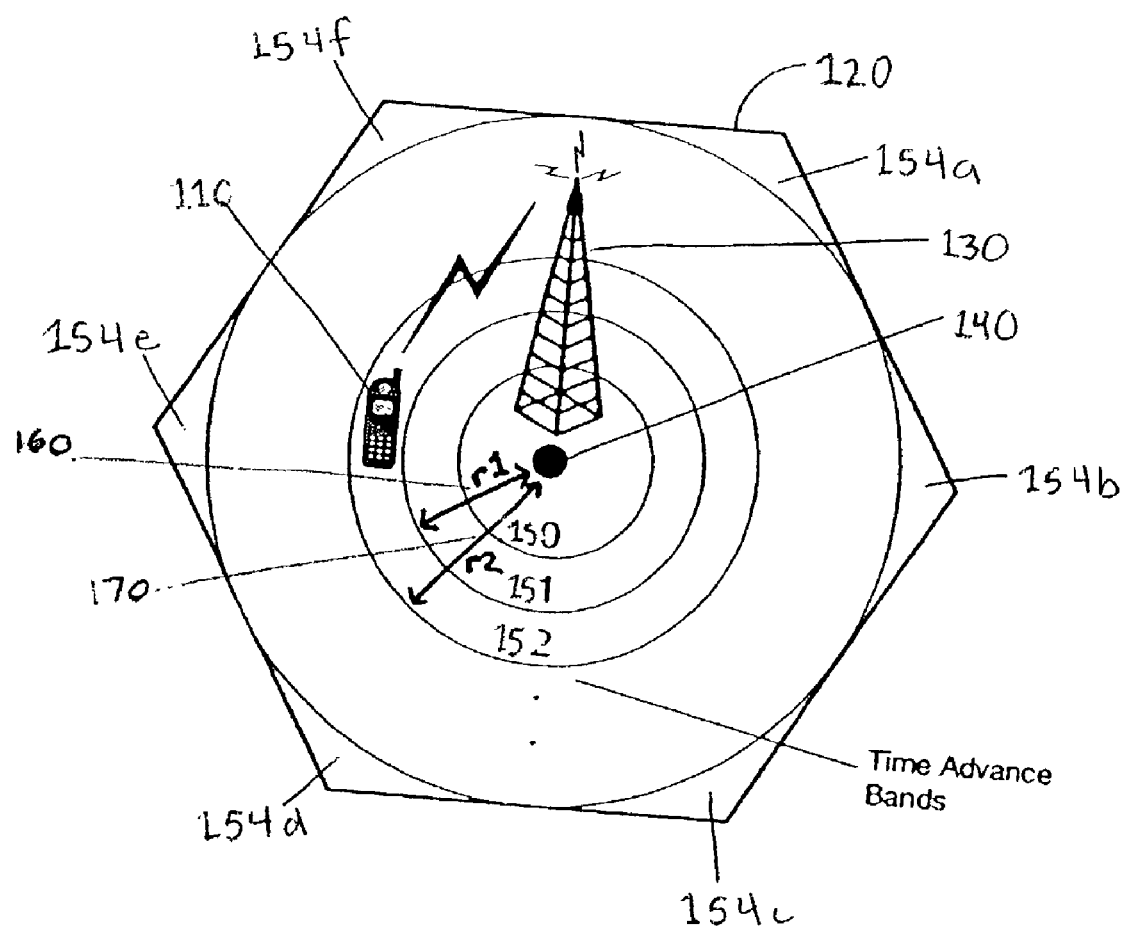
FIG. 1 illustrates a communications architecture in accordance with the present invention.

FIG. 1 illustrates a communications architecture according to an embodiment of the invention, in which a location reference point and selective position zones may be used to more accurately define the uncertainty in an initial location estimate of a hybrid communications device 110. The communications device 110 may contain both a communications transceiver, such as a cellular telephone, two-way pager, two-way radio, network-enabled personal digital assistant or other communications platform, and a positioning receiver, such as a GPS receiver or other satellite or other positioning receiver. The detected uncertainty may then be used to seed GPS or other location computations to achieve better acquisition, tracking times and other performance parameters. The communications device 110 may operate in a service area 120 and be registered or communicate with a network service site 130. The network service site 130 may be or include a cell site or other network service station, whose fixed geographical location may be known, for instance as defined by latitude and longitude data stored in network service site 130 or otherwise. In embodiments, the network service site 130 may therefore serve as a location reference point 140.

A plurality of selective position zones 150-154 may be associated with the service area 120. As illustrated, selective position zones 150-154 may consist of or include concentric rings, and the location reference point 140 may be located at the center of these rings. In embodiments, the selective position zones may be or include shapes other than rings. Depending on the implementation, the selective position zones may overlap, may share a common border, or may be contained one within another.

In embodiments, each of the selective position zones may consist of a relatively smaller area within the larger area 120. In other embodiments, each of the selective position zones may comprise an actual distance, an approximate distance, or a range of distances, from a fixed point such as the location reference point 140. In still other embodiments, each selective position zone may be or include data or a software variable that may be used to fix a location with greater precision. In embodiments, the union of the selective position zones 150-154 may cover the service area 120.

When the communications device 110 enters the network service area 120, it may register and communicate with the network service site 130. In embodiments, information may be exchanged between the communications device 110 and the network service site 130 to determine which selective position zone 150-154 the communications device 110 is located in. For example, information about the signal strength, the time delay, or the time of arrival of the signal transmitted by the communications device 110 to the service site 130 may be used to determine which selective position zone 150-154 the communications device is most likely to be located in.

In that regard, in embodiments the network service site 130 may use the concept of time-advance to ensure that communication operations served by that station may be carried out in a coherent manner. Because the service area 120 of a network service site 130 may be relatively large, signals travelling between one or more communications device 110 and the network service site 130 may be slightly delayed, depending on distance from the network service site 130. To ensure that received signals from one or more devices are synchronized to appropriate time slots in GSM, CDMA, TDMA or other systems, the network service site 130 may adjust or advance the time slot occupied by signals from a distant device in a memory buffer, or otherwise. As the distance from the handset to the base station tower or other facility increases, the signal strength decreases and the time delay increases. Therefore, the network service site 130 may perform a calculation based on the signal strength or the time delay of the incoming signal to determine its distance from the base station tower or other facility. The network service site 130 may then advance the signal by some number of discrete time slots, based on the signal strength, the time delay, or other parameters. For example, the commercial iDEN™ network deployed by Motorola Inc. may employ 16 time-advance increments of 62.5 microseconds each. Other intervals and computations are possible. In this example, stronger signals coming from a device near the network service site 130 may be advanced by 0 increments, slightly weaker signals coming from slightly further may be advanced by 1 increment, or 62.5 microseconds, and so forth.

The time-advance slots used to maintain order in received signals may be visualized as a series of concentric rings, and labeled for instance from inside to outside from 0 to n−1 or otherwise. An active device located within a particular ring, or time-advance band, may have its signal representation advanced by a corresponding number of time increments. In embodiments of the invention, these time-advance bands may be used to represent selective position zones. In FIG. 2, the selective position zones 150-154 may be correspond or be related to the time-advance bands used by the network. Other configurations are possible.

Each selective position zone in the plurality of selective position zones 150-154 may be described by an approximate distance or range of distances calculated from the time-advance information. Alternatively, each position zone may be described by mathematical expressions, may be described using an identification number, may be described in relation to the location reference point 140, or may be described in other ways.

The selective position zones 150-154 may be used to define an uncertainty in an initial location estimate of the communications device 110. In embodiments, the location reference point 140 may serve as an initial estimate of the location of the device 110. The uncertainty in this estimate may be calculated using information about the selective position zones 150-154. For example, a device may be located in a particular position zone 152, and the position zone 152 may be a ring described by the location reference point 140, an inner radius r1 160, and an outer radius r2 170. In this example, the device 110 could be said to be located at point 140, with an uncertainty of r1 to r2. Similar techniques may be used to define the location uncertainty of a device located in another selective position zone, whether the zone is ring-shaped or otherwise.

In embodiments of the invention, a plurality of location uncertainties may be used, and the estimated location of the communications device 110 may be described using a location reference point 140, and one selective location uncertainty selected from the plurality of location uncertainties. In embodiments, these selective location uncertainties may be used in conjunction with selective position zones, as an alternate representation of selective position zones, or in place of selective position zones.

Once the location of the device is known with a particular selective uncertainty, the device or the network service site may use this information to make adjustments in location processing. For example, the communications device 110 or in embodiments the network service site 130 may adjust certain processing parameters, such as increasing or decreasing the bandwidth allocated to a correlator searching for a particular Gold code or other signal, based on the uncertainty in the location of the device. This results in a corresponding increase or decrease in sensitivity in the GPS or other positioning receiver, so that when there is comparatively greater uncertainty in the position of the communications device 110, more sensitivity may be employed, whereas when there is comparatively less uncertainty, less sensitivity may be required.

FIG. 2 is a table showing selective position zones in accordance with one aspect of the present invention. In this example, the selective position zones are implemented as time advance bands; there are 16 bands, numbered 0-15, and the time advance increment is 62.5 microseconds. However, it will be clear to one skilled in the art that may other implementations are possible. In this example, the first column shows an index for each time band, and the second column shows the amount of the corresponding time advance. The third column shows the inner radius of the time-advance band, and the fourth column shows outer radius of the time-advance band.

When the selective position zones correspond exactly to the time-advance bands, an inner radius in the third column and an outer radius in the fourth column may be used to describe a selective position zone. In this case, the two radii and the location reference point may be passed as aiding information to the triangulation algorithm or other location calculation, and the satellite positioning system will search for a location fix within the particular time-advance band. This may advantageously reduce the time required to fix the location.

In alternate embodiments, the selective position zones may be related to the time-advance bands, but may not correspond exactly to the time-advance bands. For example, in some embodiments of the invention, the selective position zones may be chosen such that they overlap slightly. In these embodiments, the inner radius of the selective position zone may be smaller than the inner radius of the corresponding time-advance band, and the outer radius will be larger. In other embodiments, the selective position zones may be chosen as concentric circles, and an outer radius will suffice to describe the selective position zone.

Figure 3:
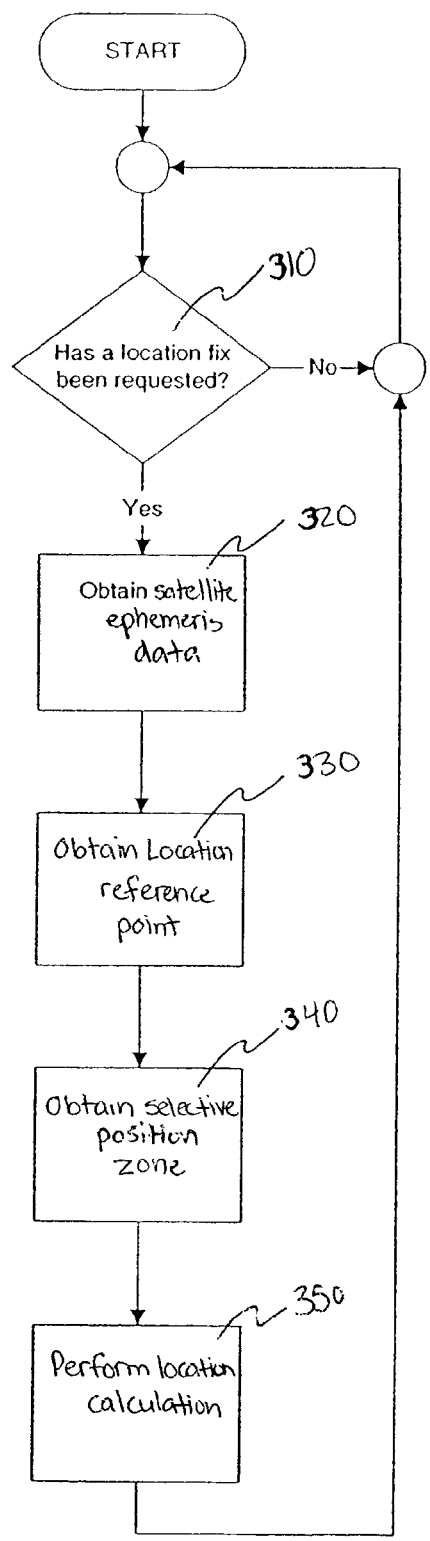
FIG. 3 is a flow chart depicting a method for determining the location of a communications device.

FIG. 3 is a flow chart depicting a method for determining the location of a communications device. The process may be initiated in step 310, when a location request is made. In step 320, satellite ephemeris data are obtained. These data may be obtained using techniques discussed above or using other techniques known in the art. In step 330, a location reference point is obtained. The reference point may be obtained, for example, over a wireless or other communications link.

In step 340, a selective position zone may be obtained. Typically, the selective position zone represents an area within which the communications device is believed to be located, or an approximate distance or range of distances from the location reference point. The selective position zone may be obtained, for example, over a wireless or other link. Alternately, other information may be obtained over a wireless or other link, and this information may be used to calculate a selective position zone. In other embodiments, the sequence in which the satellite ephemeris data, the location reference point data, and the selective position zone data are obtained may be changed, or the data may be obtained simultaneously. Depending on the implementation, selective uncertainty data may be used in addition to or in place of selective position zone data.

In step 350, a location calculation is performed. In embodiments, the location calculation may be a triangulation calculation or another calculation. The satellite ephemeris data obtained in step 320, the location reference point obtained in step 330, and the selective position zone data obtained in step 340 may used in the location calculation.

Figure 4:
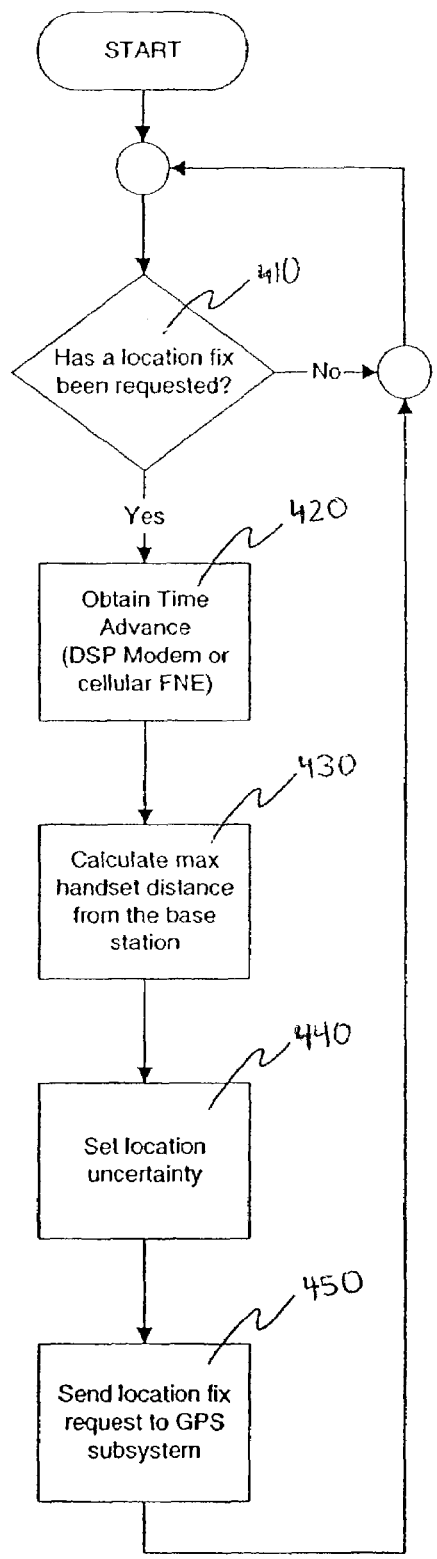
FIG. 4 is a flow chart depicting a method for setting a selective uncertainty in accordance with the present invention.

FIG. 4 is a flow chart depicting a method for setting a selective uncertainty in accordance with the present invention. The process may begin in step 410, when a location fix has been requested. Once a location fix has been requested, a time advance datum may be obtained in step 420. This time advance datum may be an identifying number corresponding to a time advance band, information corresponding to the duration of the time advance, information corresponding to a distance or range of distances, or any other information which can be used to determine the uncertainty of an initial position estimate.

In step 430, depending on the implementation, the maximum handset distance from the initial position estimate may be calculated. In embodiments, the minimum handset distance from the position estimate may be calculated. In some embodiments, the necessary information may already be known, and calculation 430 will not take place.

In step 440, the location uncertainty may be set to a predetermined value, depending on the time advance data or the results of calculation 430. In step 450, a location fix request may be sent to the GPS subsystem.

Figure 5:
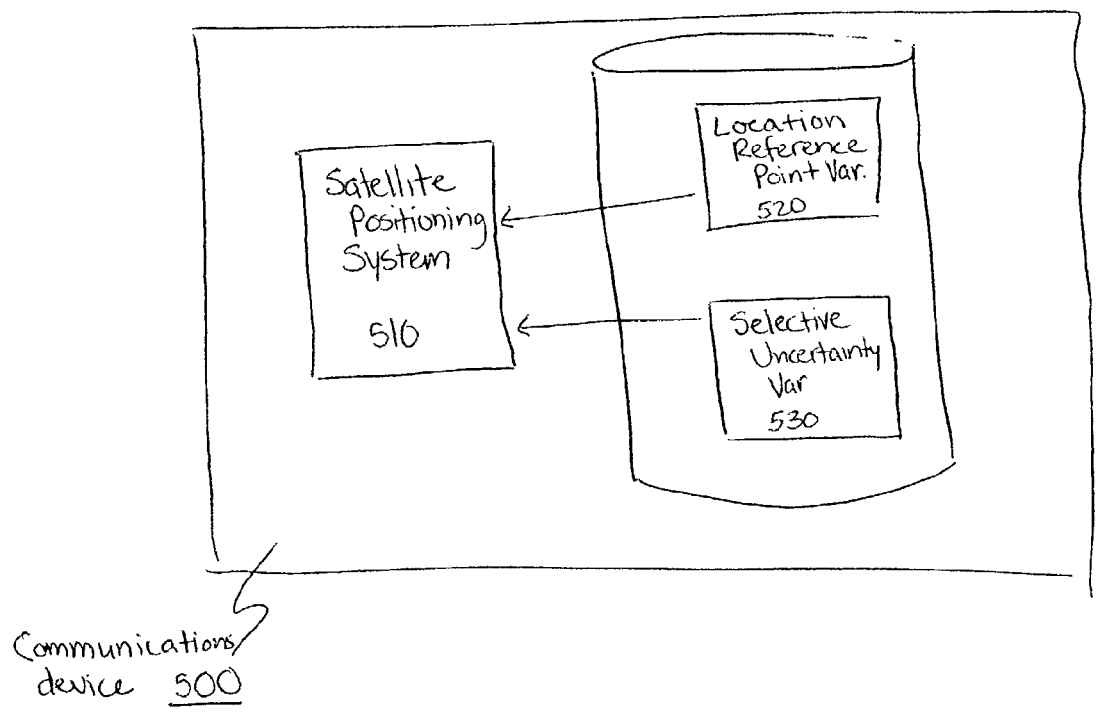
FIG. 5 is a block diagram illustrating a communications device in accordance with the present invention.

FIG. 5 illustrates a communications device 500 in accordance with the present invention. The communications device 500 may be or include a cellular telephone, a two-way pager, a maritime radio, a personal digital assistant, or other communications device. The communications device 500 may also include a satellite positioning system 510, which may be used to calculate the location of the device. The device 500 may further contain a datum 520 representing a location reference point and a datum 530 representing a selective position zone. These data may be implemented, for example, as software variables or in other ways. When a location fix is requested, the location reference datum 520 and the selective position zone datum 520 may be calculated, derived, received via a wireless or other communications link, or otherwise obtained. Variables representing these data may be set or this information may be otherwise stored in the system. These data may then be passed to or accessed by the satellite positioning system 510. The satellite positioning system 510 may then use these data 520 and 530 as aiding information to a triangulation algorithm or other location calculation.

Figure 6:
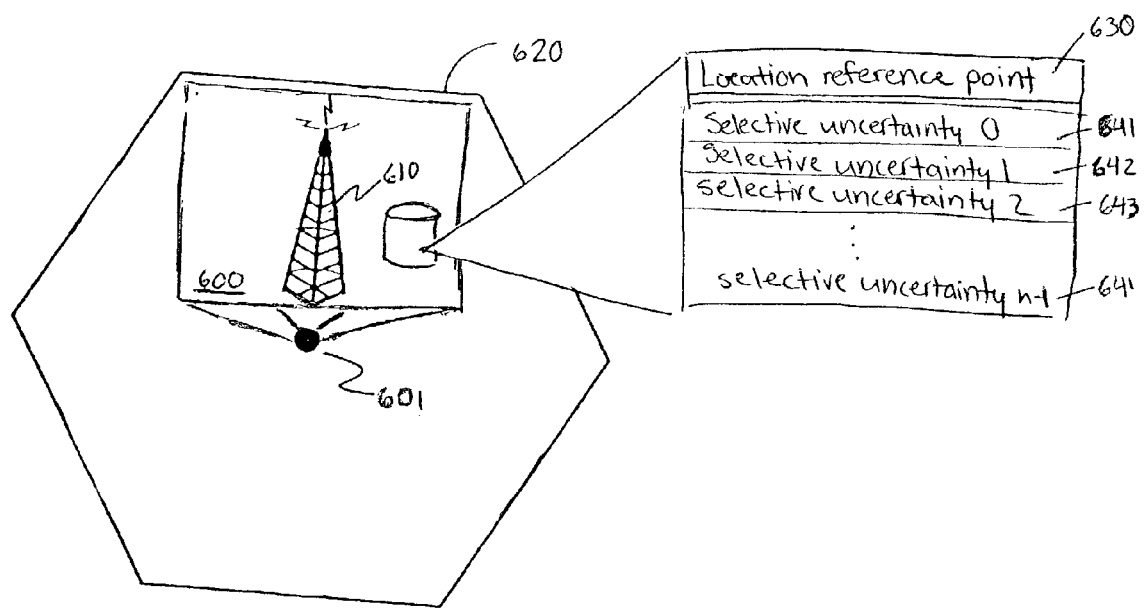
FIG. 6 is a block diagram illustrating a system for aiding a satellite positioning system in a remote communications device, in accordance with the present invention.

FIG. 6 illustrates a system 600 for aiding a satellite positioning system in a remote communications device, in accordance with the present invention. In embodiments, the system may be or include a network service site such as a cell site or other network service station. The system 600 may further include a transceiver 610 or other system for communicating with a remote communications device (not shown). Typically, the system 600 will communicate with a remote device that is located within a given physical area 620.

The system 600 may contain a datum 630 that represents a location reference point. Typically, the location reference point represented by datum 630 will be the physical location 601 of the system 600.

The system 600 may further contain a plurality of data 641-644 that represent a plurality of selective position zones. Typically, each selective position zone in the plurality of selective position zones represents a portion of the area 620. In embodiments, the selective position zones in the plurality of data 641-644 may be chosen such that the union of the selective position zones covers the area 620.

When a request for the location of a communications device is made, the system 600 may communicate the location reference point 630 to the device. The system 600 may further determine in which selective position zone the communications device is located. The system 600 may then communicate the corresponding datum in the plurality of data 641-644 to the device via the communication system 610. Alternately, the system 600 may make a calculation based on the corresponding datum and communicate the result to the communication system 610. The result of the calculation may be, for example, a time-advance index, a time advance, an approximate location, a range of locations, a location uncertainty, or other information.

Figure 7:
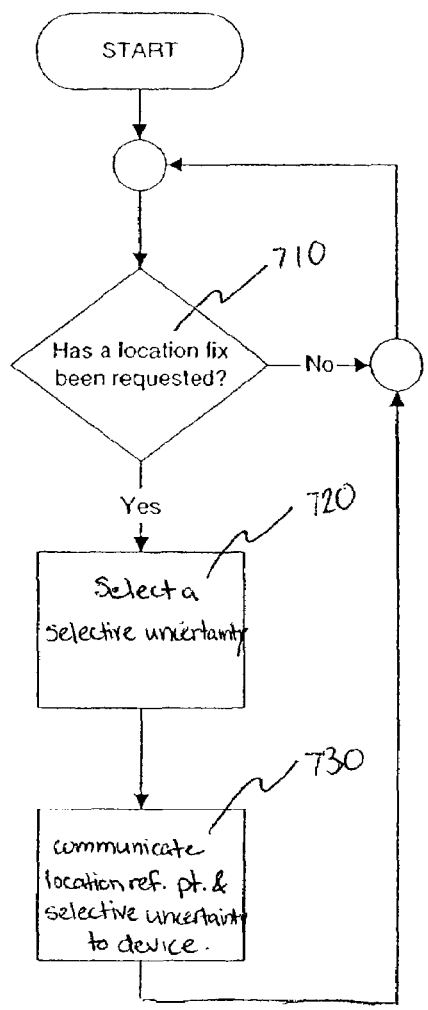
FIG. 7 is a flow chart depicting a method for aiding a satellite positioning system in a remote device, in accordance with the present invention.

FIG. 7 is a flow chart depicting a method for aiding a satellite positioning system in a remote device, in accordance with the present invention. The method may be initiated in step 710, when a location fix is requested. In step 720, one selective position zone may be selected out of a plurality of selective position zones. In step 730, the selective position zone and a location reference point may be communicated to the remote device.

The foregoing description of the system and method for location-aiding for a satellite positioning system according to the invention is illustrative, and variations in configuration and implementation will occur to persons skilled in the art. For instance, while the invention has generally been described as containing a relatively small number of discrete selective position zones, in embodiments the number of selective position zones could be increased or made continuous. Similarly, while the selective position zones have been described as corresponding to fixed rings or other areas, in embodiments the selective position zones could change over time. The selective position zones could also be altered as the location of the handset or the signal from the handset change.

It has likewise been noted that the communications device and corresponding network in which the invention may operate may be or include a cellular telephone, but could consist of other communications platforms such as other wired or wireless telephones, two-way radios such as public service, maritime or other radio links, network-enabled wireless communications devices such as 802.11a, 802.11b, 802.11 g or other short or long-range telephony or other units, or other communications equipment as well. In addition, while the invention has been generally described in terms of a positioning receiver integrated in a cellular handset or other communications device, in embodiments the cellular base station or other network service site may likewise or alternatively be equipped with positioning receiver equipment, and the invention may be or include, or may partly or otherwise operate in the network service site.

Further, while certain calculations may have been illustratively described as occurring in certain parts of the network architecture, in embodiments computations may be distributed to one or more different parts of the overall network, or consolidated in one or more parts of the overall network, depending on implementation. For instance, while the selective uncertainty data has generally been described as being generated in the base station or other network service station 130 and communicated to the communications device 110 to seed a local position determination in that device, in embodiments the position computation may be performed or partly performed in the network service station 130 or elsewhere, and be communicated to the communications device 110 or otherwise.

Furthermore, the invention has been generally described as finding a selective position zone based on a distance to one network service site. Therefore, the selective position zones and the selective uncertainties so described are not directional, but reflect only on a distance from a fixed location. However, in embodiments the techniques described above may be used in conjunction with detection by multiple network service sites. If two or more network service sites are used to derive a selective position zone, the selective position zone may then be directional, as it may represent a particular intersecting zone or zones between the service sites. Consequently, the selective uncertainties calculated based on data from two or more network service sites may then be directional as well.

The scope of the invention is accordingly intended to be limited only by the following claims.

We claim:

1. A communication device having means for determining a location of the communications device, comprising:

first data, residing in the communication device, representing at least one selective uncertainty of an initial location of the communications device, and wherein the at least one selective uncertainty is based at least in part on a time advance value for the communications device for communicating with a network service site, wherein the time advance value is used to indicate an approximate position of the communication device relative to the network service site; and a positioning receiver disposed in the communication device, the positioning receiver using the first data to aid an initial position determination of the communications device;

wherein the initial position determination is performed by the communication device.

2. A communication device according to claim 1, wherein the at least one selective uncertainty is further based at least in part on a signal strength of a signal received from the communications device.

3. A communication device according to claim 1, wherein the communications device comprises at least one of a cellular telephone, a two-way pager, a personal digital assistant and a two-way radio.

4. A communication device according to claim 1, wherein the at least one selective uncertainty represents a portion of an area serviced by the network service site.

5. A communication device according to claim 1, wherein the network service site comprises a wireless network service site.

6. A communication device according to claim 5, wherein the wireless network service site comprises a cellular base station.

7. A communication device according to claim 1, wherein the at least one selective uncertainty represents an approximate distance from the communications device to the location reference point.

8. A communication device according to claim 1, wherein the at least one selective uncertainty comprises a plurality of selective uncertainties.

9. A communication device according to claim 8, wherein each of the selective uncertainties represents an approximate range of distance from the location reference point.

10. A communication device according to claim 8, wherein each of the selective uncertainties represents a portion of an area serviced by a network service site.

11. A communication device according to claim 8, wherein the union of the selective uncertainties comprises the physical area serviced by the network service site.

12. A communication device according to claim 1, wherein the positioning receiver comprises a satellite positioning receiver.

13. A communication device according to claim 12, wherein the satellite positioning receiver uses at least the first data to adapt receiver parameters to aid the initial position determination.

14. A communication device according to claim 13, wherein the adapted receiver parameters comprise at least an adjustment to correlator bandwidth in the satellite position.

15. A method for determining a location of a communications device, comprising:
receiving, at the communication device, first data representing at least one selective uncertainty of a location of the communications device, and wherein the at least one selective uncertainty is based at least in part on a time advance value for the communications device communicating with a network service site, wherein the time advance value is used to indicate an approximate position of the communication device relative to the network service site; and
determining an initial position of the communications device based at least on part on the first data, performed by a positioning receiver disposed in the communication device;
wherein determining the initial position of the communication device is performed by the communication device.

16. A method according to claim 15, further comprising generating the at least one selective uncertainty is further based at least in part on a signal strength of a signal received from the communications device.

17. A method according to claim 15, wherein the communications device comprises at least one of a cellular telephone, a two-way pager, a personal digital assistant and a two-way radio.

18. A method according to claim 15, wherein the at least one selective uncertainty represents a portion of an area serviced by the network service site.

19. A method according to claim 15, wherein the network service site comprises a wireless network service site.

20. A method according to claim 19, wherein the wireless network service site comprises a cellular base station.

21. A method according to claim 15, wherein the at least one selective uncertainty represents an approximate distance from the communications device to the location reference point.

22. A method according to claim 15, wherein the at least one selective uncertainty comprises a plurality of selective uncertainties.

23. A method according to claim 22, wherein each of the selective uncertainties represents an approximate range of distance from the location reference point.

24. A method according to claim 22, wherein each of the selective uncertainties represents a portion of an area serviced by a network service site.

25. A method according to claim 22, wherein the union of the selective uncertainties comprises a physical area serviced by a network service site.

26. A method according to claim 15, wherein the communications device comprises a positioning receiver.

27. A method according to claim 26, wherein the positioning receiver comprises a satellite positioning receiver.

28. A method according to claim 27, further comprising adapting parameters in the satellite positioning receiver based upon at least the first data to aid the initial position determination.

29. A method according to claim 28, wherein the step of adapting parameters in the satellite positioning receiver comprises at least adjusting correlator bandwidth in the satellite positioning receiver.

30. A communication device having means for determining a location of the communications device, comprising:
processing means, the processing means generating at least first data representing at least one selective uncertainty of a location of the communications device, and wherein the at least one selective uncertainty is based at least in part on a time advance value for the communications device communicating with the network service site, wherein the time advance value is used to indicate an approximate position of the communication device relative to the network service site; and
positioning receiver means, the positioning receiver means for determining an initial position of the communications device using at least the first data;
wherein determining the initial position is performed by the communication device.

31. A system according to claim 30, wherein the at least one selective uncertainty is further based at least in part on a signal strength of a signal received from the communications device.

32. A system according to claim 30, wherein the positioning receiver means comprise a satellite positioning receiver.

33. A system according to claim 32, wherein the satellite positioning receiver uses the first data to adapt receiver parameters to aid the initial position determination.

34. A system according to claim 33, wherein the adapted receiver parameters comprise at least an adjustment to correlator bandwidth in the satellite positioning receiver.

* * * * *